United States Patent [19]

Abensour et al.

[11] Patent Number: 5,251,207
[45] Date of Patent: Oct. 5, 1993

[54] COMBINED TERMINAL ADAPTER FOR SMDS AND FRAME RELAY HIGH SPEED DATA SERVICES

[75] Inventors: Daniel S. Abensour; Jon E. Fox, both of Cary; Mehendra J. Joshi; Fuyung Lai, both of Raleigh, all of N.C.; Kian-Bon K. Sy, Yokohama, Japan

[73] Assignee: International Business Machines Corporation, Armonk, N.Y.

[21] Appl. No.: 848,907

[22] Filed: Mar. 10, 1992

[51] Int. Cl.⁵ ............................................. H04L 12/56
[52] U.S. Cl. .................. 370/60.1; 370/94.2; 370/99; 370/110.1; 365/230.03
[58] Field of Search ................... 370/79, 84, 99, 110.1, 370/58.1, 60, 60.1, 94.1, 94.2; 178/2 B; 375/121; 341/106; 365/230.01, 230.03, 230.08; 360/72.1

[56] References Cited

U.S. PATENT DOCUMENTS

| | | | |
|---|---|---|---|
| 4,998,242 | 3/1991 | Upp | 370/60 |
| 5,056,084 | 10/1991 | Corre | 370/99 |
| 5,142,528 | 8/1992 | Kobayashi et al. | 370/79 |

OTHER PUBLICATIONS

*Business Communications Review*, Sep. 1991, pp. 59–63; "SMDS vs. Frame Relay: An Either/or Decision ?".

*Data Communications*, Apr. 1991, pp. 105–108, 110; "SMDS: The Beginning of WAN Superhighways."

*Telephonys Transmission Special*, Nov. 1990, pp. 17, 18, 22; "RHCs to open data spigot with SMDS and frame relay."

*AT&T Technology*, vol. 6, No. 1, 1991; pp. 6–11, "Metropolitan Area Networks-Data Transport Highways".

*Tenth Annual International Phoenix Conference on Computers and Communications*, pp. 546–551, Mar. 1991: "Interworking Between Frame Relay and ISDN".

*Primary Examiner*—Benedict V. Safourek
*Attorney, Agent, or Firm*—Stephen T. Keohane

[57] ABSTRACT

A terminal adapter interfaces between a Data Terminating Equipment (DTE) and either a Frame Relay or a Switched Multimegabit Data Service (SMDS) telecommunications network so that the type of network over which the DTE is communicating is transparent to the DTE. The terminal adapter performs mapping from one protocol to another so that a native frame relay DTE can access an SMDS network and so that a native SMDS DTE can access a frame relay network. The address mapping method performed by the terminal adapter uses a parallel table look-up technique which reduces the chance of collision (when two or more addresses hash into the same table entry), eliminates the traditional comparison function to detect a collision, and eliminates the traditional pointer technique when a collision occurs.

19 Claims, 17 Drawing Sheets

FIG. 1
PRIOR ART
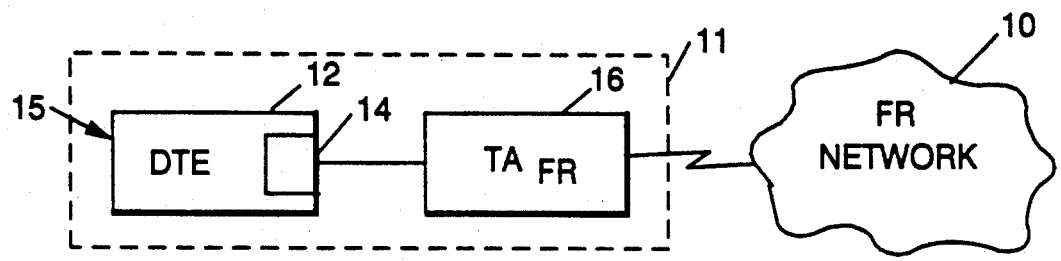
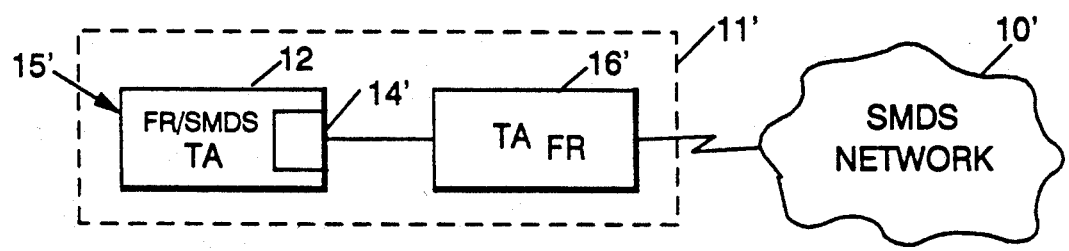
FIG. 4
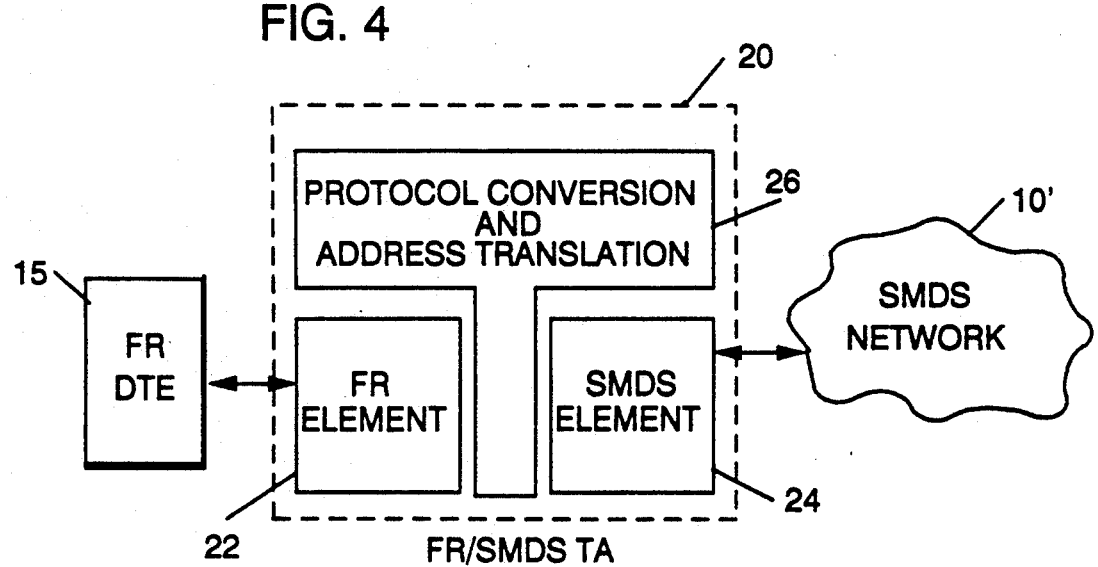

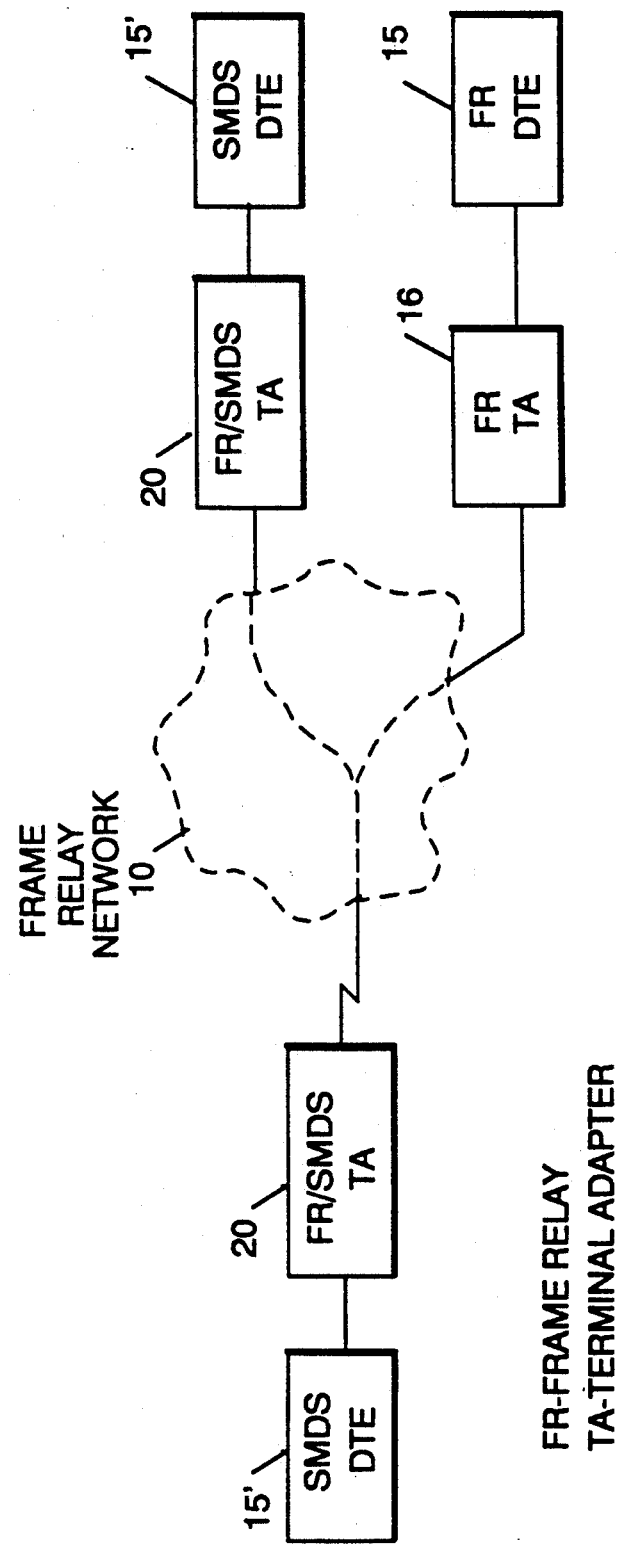

H SMDS = HEADER FOR SMDS
T SMDS = TRAILER FOR SMDS

TRUTH TABLE

| NV1 | NV2 | NV3 | NV4 | R1 | R2 | R3 | R4 | P1 | P2 | P3 | P4 | 01 | 02 | 03 | 04 | 05 |
|---|---|---|---|---|---|---|---|---|---|---|---|---|---|---|---|---|
| 0 | X | X | X | X | X | X | X | X | X | X | X | 1 | 0 | 0 | 0 | 0 |
| 1 | 0 | X | X | X | X | X | X | X | X | X | X | 0 | 1 | 0 | 0 | 0 |
| 1 | 1 | 0 | X | X | X | X | X | X | X | X | X | 0 | 0 | 1 | 0 | 0 |
| 1 | 1 | 1 | 0 | X | X | X | X | X | X | X | X | 0 | 0 | 0 | 1 | 0 |
| 1 | 1 | 1 | 1 | 1 | X | X | X | 0 | X | X | X | 1 | 0 | 0 | 0 | 0 |
| 1 | 1 | 1 | 1 | 0 | 1 | X | X | X | 0 | X | X | 0 | 1 | 0 | 0 | 0 |
| 1 | 1 | 1 | 1 | 0 | 0 | 1 | X | X | X | 0 | X | 0 | 0 | 1 | 0 | 0 |
| 1 | 1 | 1 | 1 | 0 | 0 | 0 | 1 | X | X | X | 0 | 0 | 0 | 0 | 1 | 0 |
| 1 | 1 | 1 | 1 | X | X | X | X | 1 | 1 | 1 | 1 | 0 | 0 | 0 | 0 | 1 |

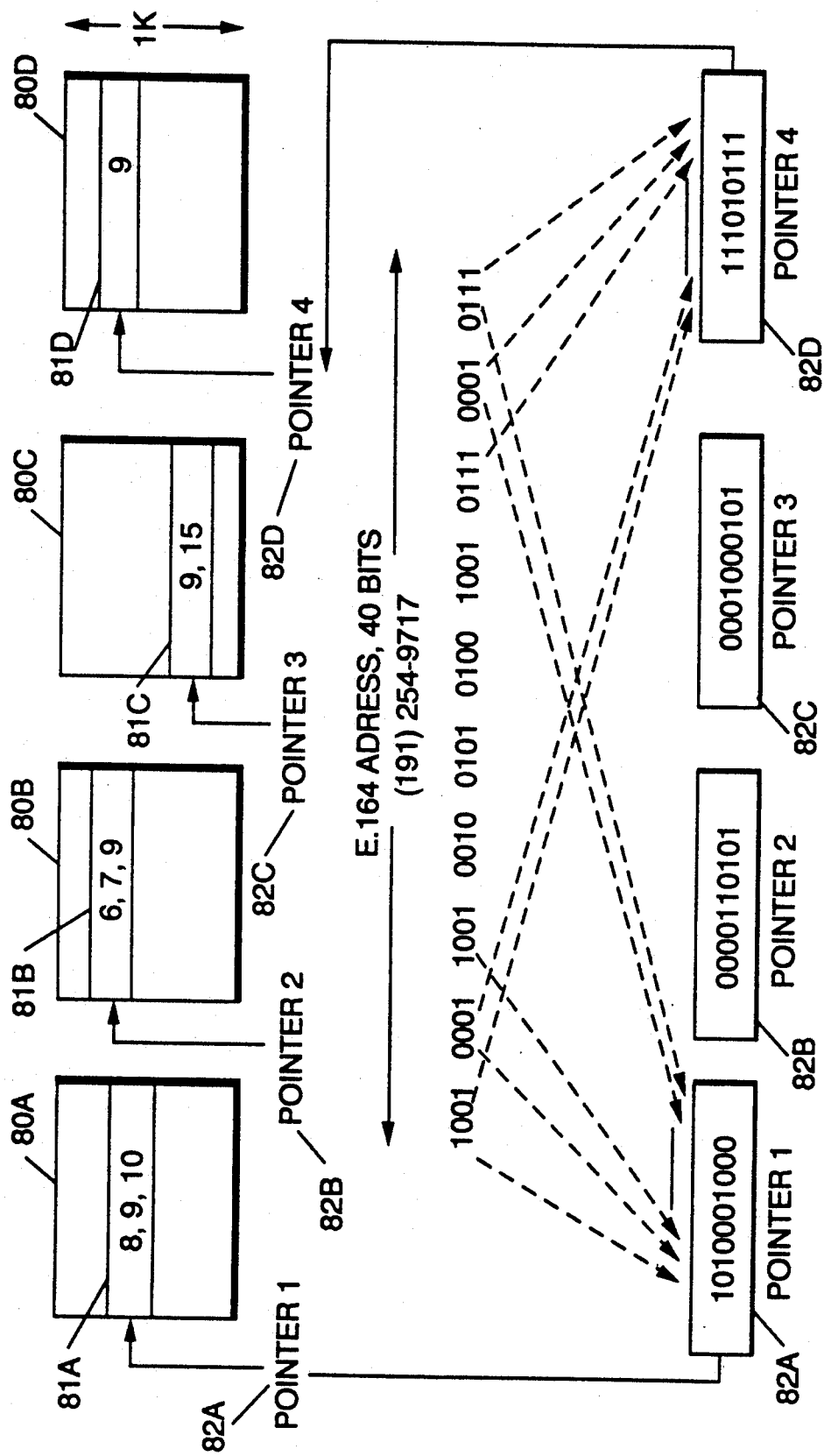

FIG. 12
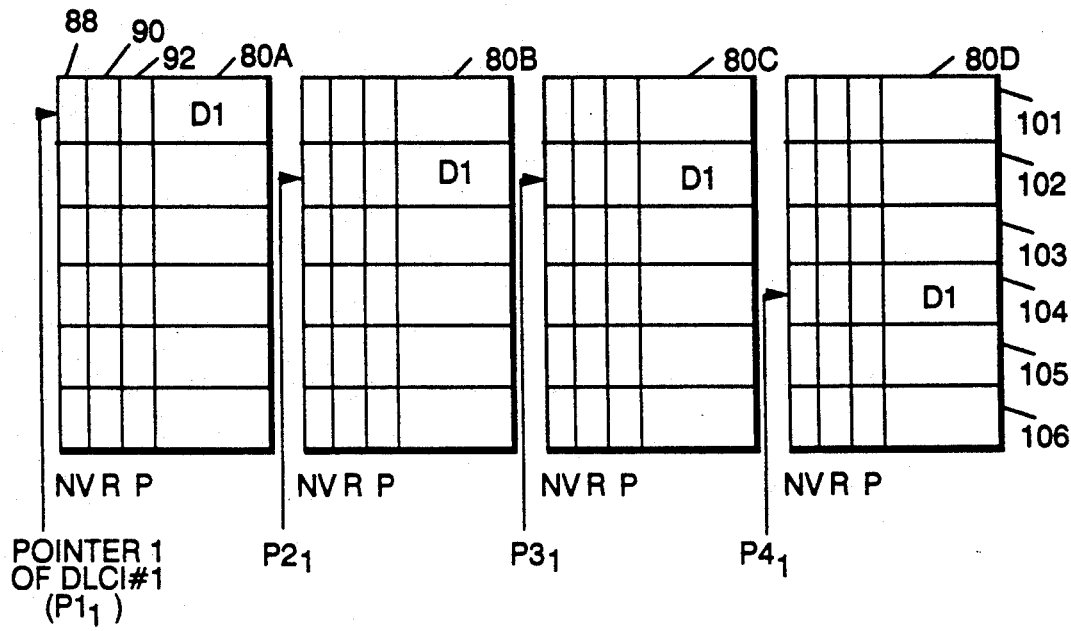
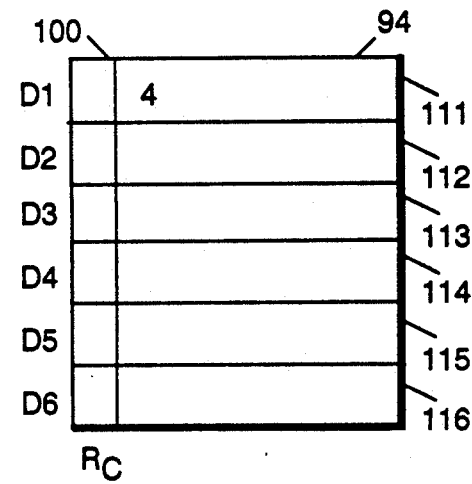

FIG. 13
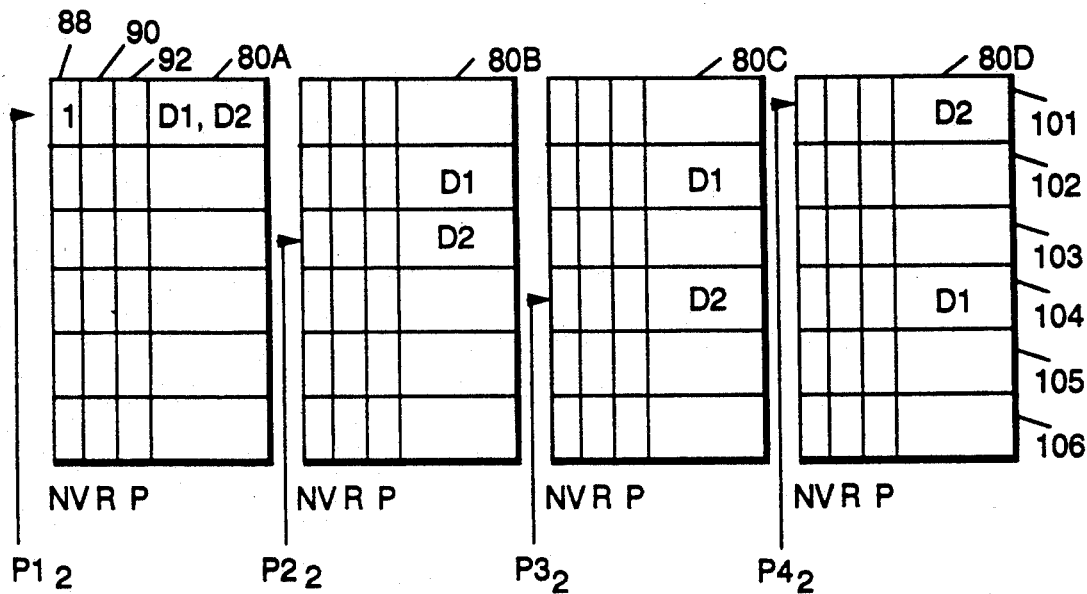
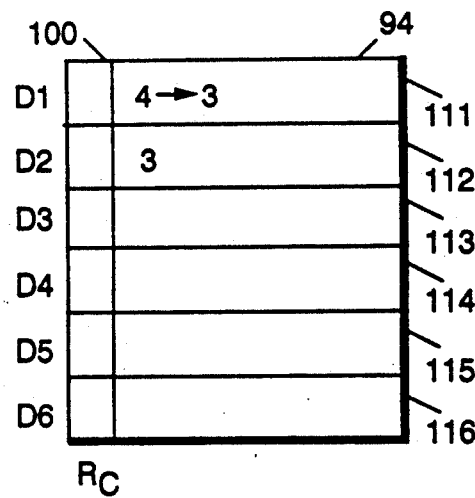

FIG. 14
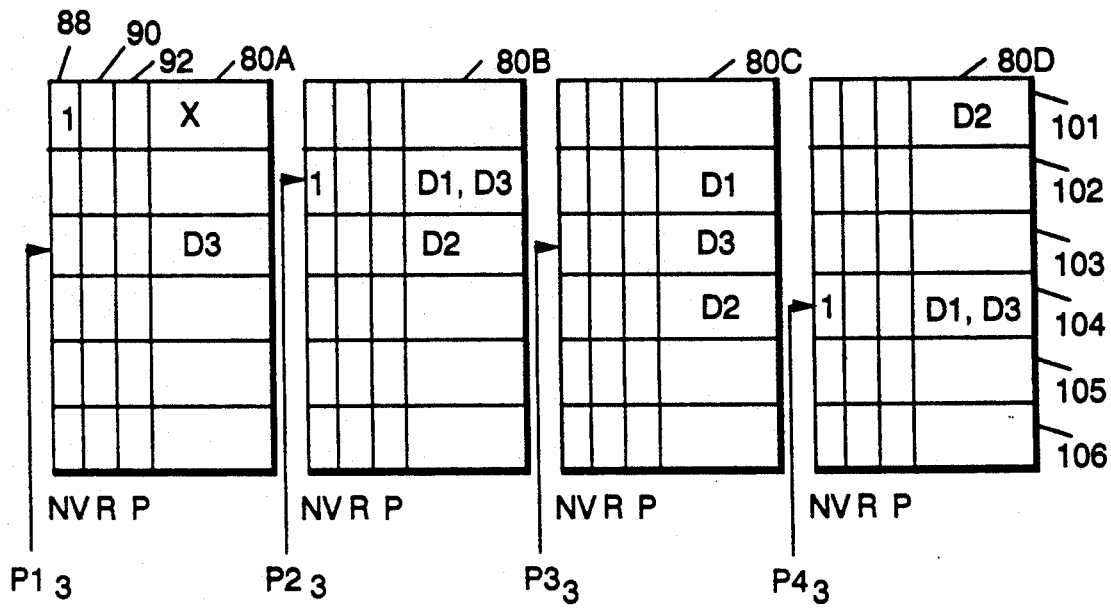
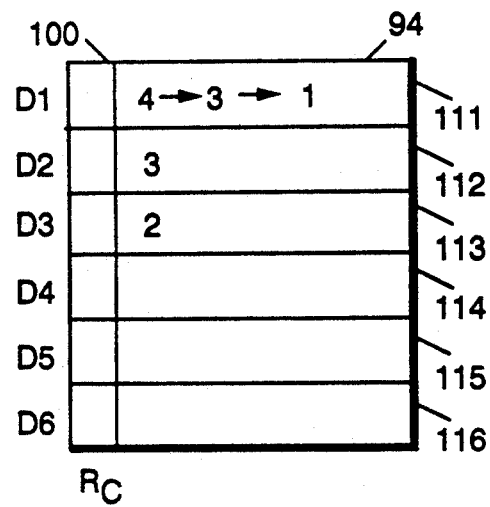

FIG. 15
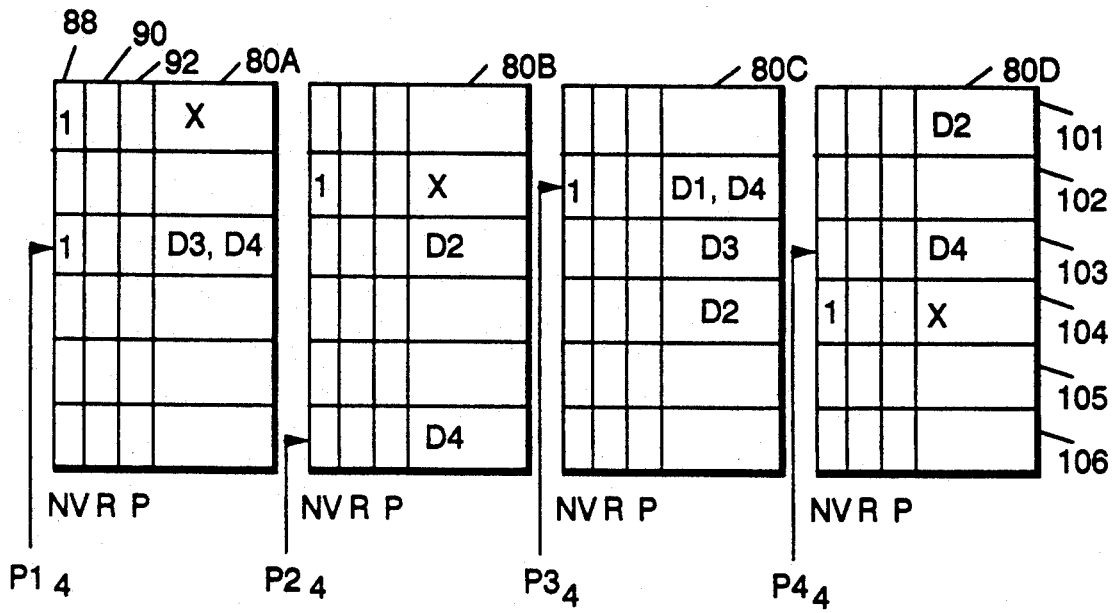
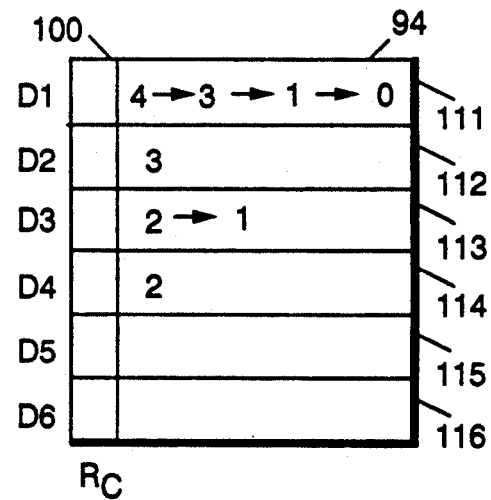

FIG. 16
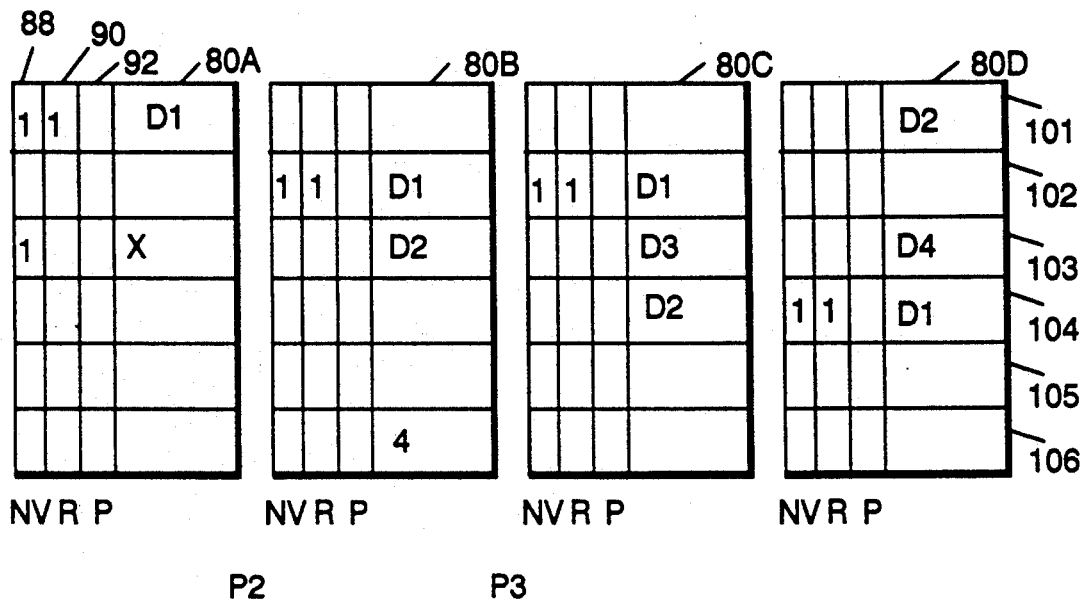
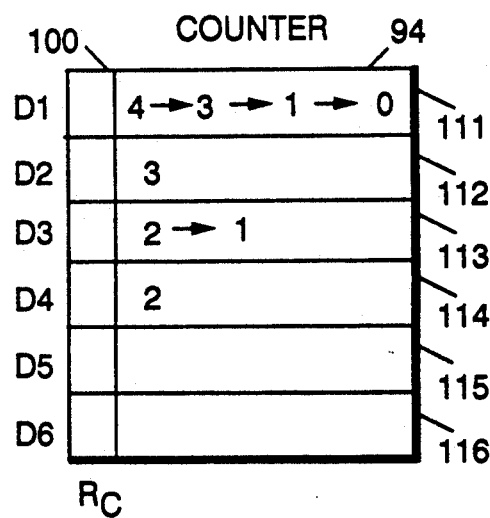

FIG. 17
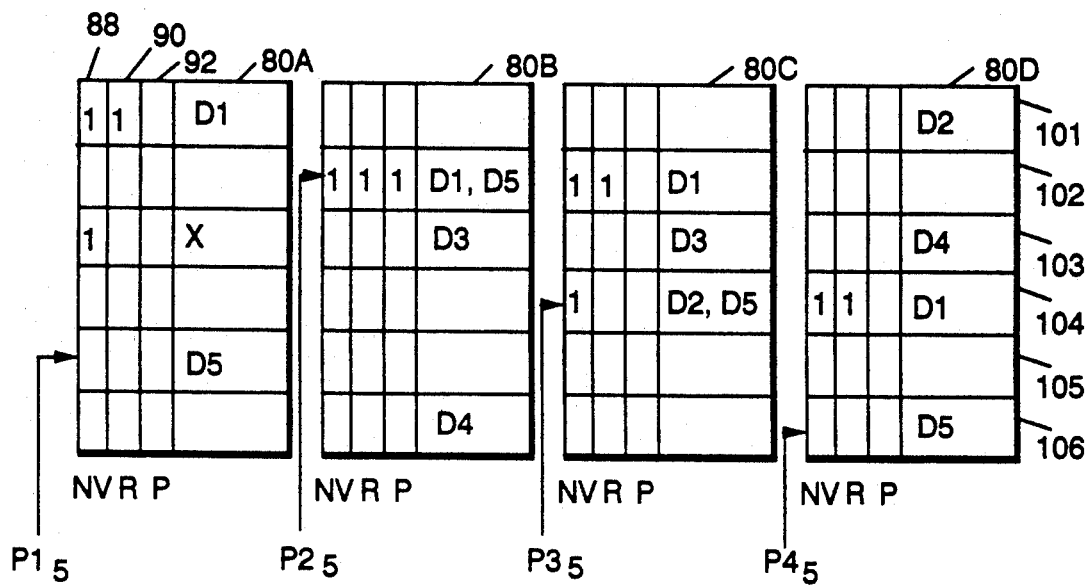
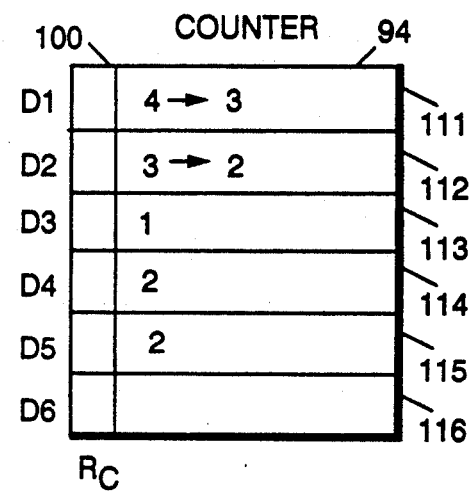

FIG. 18
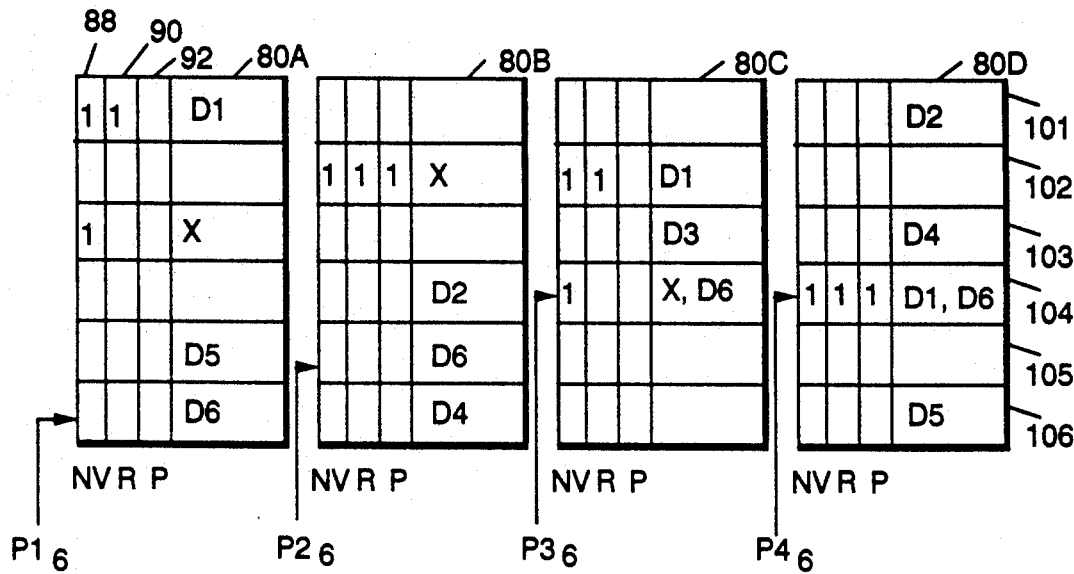
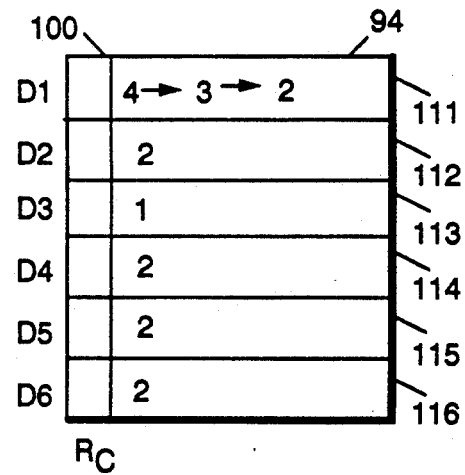

COMBINED TERMINAL ADAPTER FOR SMDS AND FRAME RELAY HIGH SPEED DATA SERVICES

BACKGROUND OF THE INVENTION

I. Field of the Invention

The present invention relates to high speed data networkinq in telecommunications and, more particularly, to a terminal adapter for allowing data terminal equipment (DTE) access both the frame relay and Switched Multimegabit Data Service (SMDS) high speed data services without the additional requirement of service-specific software and hardware in the customer premises equipment (CPE).

II. Prior Art

Over the past decade, many businesses, through growth and mergers, have dispersed their locations across the country and, in many cases, around the world. In the various business locations, local area networks (LANs) are used for interconnecting groups of people using PCs and workstations. As the popularity of LANs increases, so does the need for the interconnection of those LANs located across the country and around the world.

But as the size and geographic dispersement of these private networks grow, the interconnect expense increases. The cost and complexity of building and managing these private networks increase exponentially as more equipment, facilities and expertise is required.

Switched multimegabit data service (SMDS) and frame relay (FR) services are fairly new alternatives that can be used by public network operators to switch data through the network. Frame relay and SMDS, both "fast packet" multiplexing specifications, are designed to create more efficient wide area networks (WANs) by permitting users to access only the amount of bandwidth they need for a given application. In addition, both frame relay and SMDS have been recognized as being able to improve LAN networking solutions by standardizing LAN interconnection techniques and by reducing the number of required leased lines in a network.

This, however, is where the similarities between the two services ends. For example, frame relay is a "connection-oriented" protocol. It establishes a logical connection for the duration of the call, and it is initially being implemented as a permanent virtual circuit (PVC) service. In contrast, SMDS, which has adopted the IEEE 802.6 protocol, presently uses a "connectionless" protocol, meaning it doesn't set up a logical, ongoing connection for the duration of the call.

Another major difference between frame relay and SMDS is in the packets themselves. Frame relay packets, called frames, are variable in size—each frame in a frame relay network may be a different length from any other SMDS packets, called cells, have a fixed size of 53 octets, which are eight-bit groups of data.

Furthermore, frame relay specifications define connections of speeds of 56 kbps to 1.5 Mbps, whereas SMDS describes speeds ranging from 1.5 to over 30 Mbps.

Although it is not clear as to which service, or both, the public networks will offer in the long-term, it is apparent that the network users should to be prepared to use either, or both, of the services. The service subscriber uses a communications product (DTE), such as a communications controller, a router, or a channel extender to access the frame relay and SMDS services. A terminal adapter (TA) is used to interface the DTE to the network. Because the mechanism and protocol to access these services are so strikingly different, a separate communications adapter (used to interface the DTE to the terminal adapter) and a separate terminal adapter are needed in order to access both of these services. This is shown in FIG. 1.

For instance, in order to access the frame relay network 10, a subscriber having customer premises equipment (CPE) 11 comprising a DTE 12 having a frame relay communications adapter 14 for interfacing with a frame relay terminal adapter 16. Presently, the accepted protocols for exchanging communication between the frame relay communications adapter 14 and the frame relay terminal adapter 16 is RVX (or RS 449, V.35, or X.21 type interface protocols). The DTE 12 and the frame relay communications adapter 14 comprise a "native" frame relay DTE 15. Similarly, the frame relay terminal adapter 16 is needed for communicating over the frame relay network 10 utilizing Link Access Procedure-D (LAPD), a protocol that originated in Integrated Services Digital Network (ISDN) standards.

With regard to a SMDS network 10', the subscriber must have a CPE 11' comprising a DTE 12, an SMDS communications adapter 14', and an SMDS terminal adapter 16' to employ the accepted interface protocol, the High Speed Serial Interface (HSSI). The DTE 12 and the SMDS communications adapter 14' comprise a native SMDS DTE 15'. The SMDS terminal adapter 16' communicates over the SMDS network 10' which has adopted the IEEE 802.6 protocol that supports packet voice/video services, as well as data transfer.

Because of evolutionary considerations, such as interface and protocol standardization and equipment availability, frame relay and SMDS will have to co-exist. Thus, it is desirable to have a CPE comprising a single terminal adapter which, on the terminal side, will interface with the subscriber's DTE and communications adapter and, on the network side, will interface with either an SMDS or a frame relay network.

SUMMARY OF THE INVENTION

The present invention comprises a terminal adapter for interfacing between a Data Terminating Equipment (DTE) and either a frame relay or a Switched Multimegabit Data Service (SMDS) telecommunications network. The type of network over which the DTE is communicating is transparent to the DTE.

The terminal adapter of the present invention performs mapping from one protocol to another so that a native frame relay DTE can access an SMDS network and so that a native SMDS DTE can access a frame relay network. The terminal adapter has three elements: a frame relay element; an SMDS element; and a protocol conversion and address translation element. The frame relay element understands and complies with frame relay protocol. Similarly, the SMDS element understands and complies with the SMDS protocol. The protocol conversion and address translation element performs the address and protocol mapping between frame relay and SMDS.

In addition, the address mapping method performed by the protocol conversion and address translation element differs from conventional methods. The addresses are mapped using a parallel table look-up technique which reduces the chance of collision (when two or more addresses hash into the same table entry), eliminates the traditional comparison function to detect a collision, and eliminates the traditional pointer technique when a collision occurs.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 1 is a prior art diagram illustrating how a frame relay and a SMDS network are presently accessed.

FIG. 3 is a diagram illustrating the frame relay/SMDS terminal adapter of the present invention interfacing a frame relay network.

FIG. 4 is a diagram illustrating the three elements of the frame relay/SMDS terminal adapter interfacing with an SMDS network.

FIG. 10 illustrates the formation of pointers for addressing the memory tables.

FIGS. 12-19 illustrate an example of how the mapping system is configured.

DETAILED DESCRIPTION OF THE PREFERRED EMBODIMENT

1. The frame relay/SMDS Terminal Adapter (TA)

Figure 2:
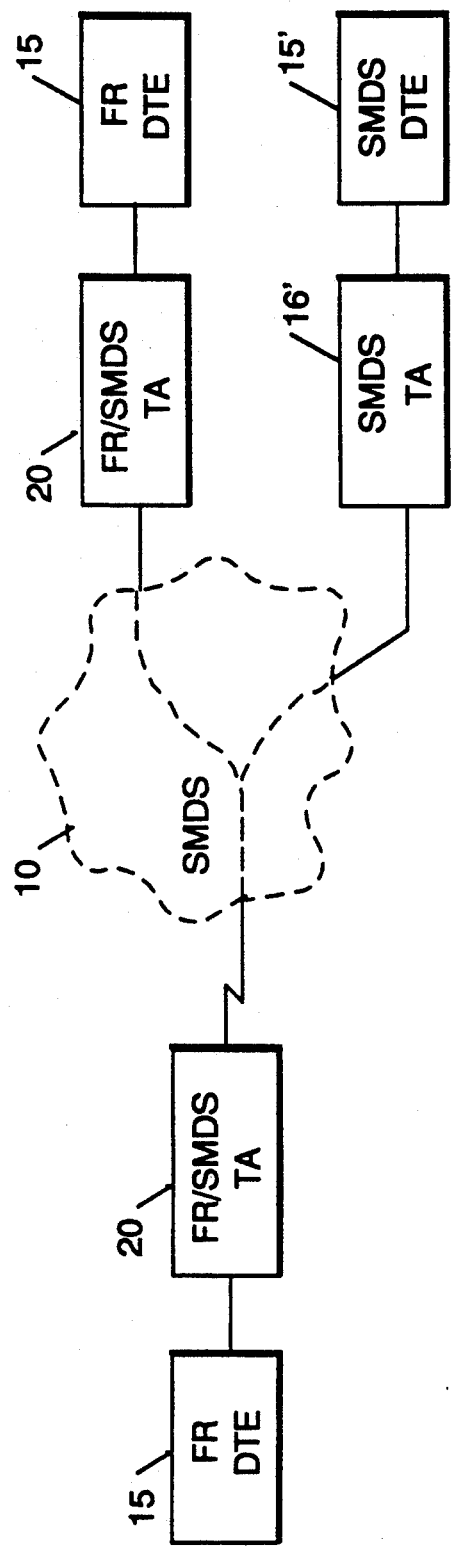
FIG. 2 is a diagram illustrating the frame relay/SMDS terminal adapter of the present invention interfacing an SMDS network.

FIG. 2 illustrates two frame relay/SMDS terminal adapters 20 of the present invention connecting two native frame relay DTEs 15 and an SMDS network 10'. An SMDS terminal adapter 16' is an interface between a native SMDS DTE 15' with the SMDS network.

Figure 5:
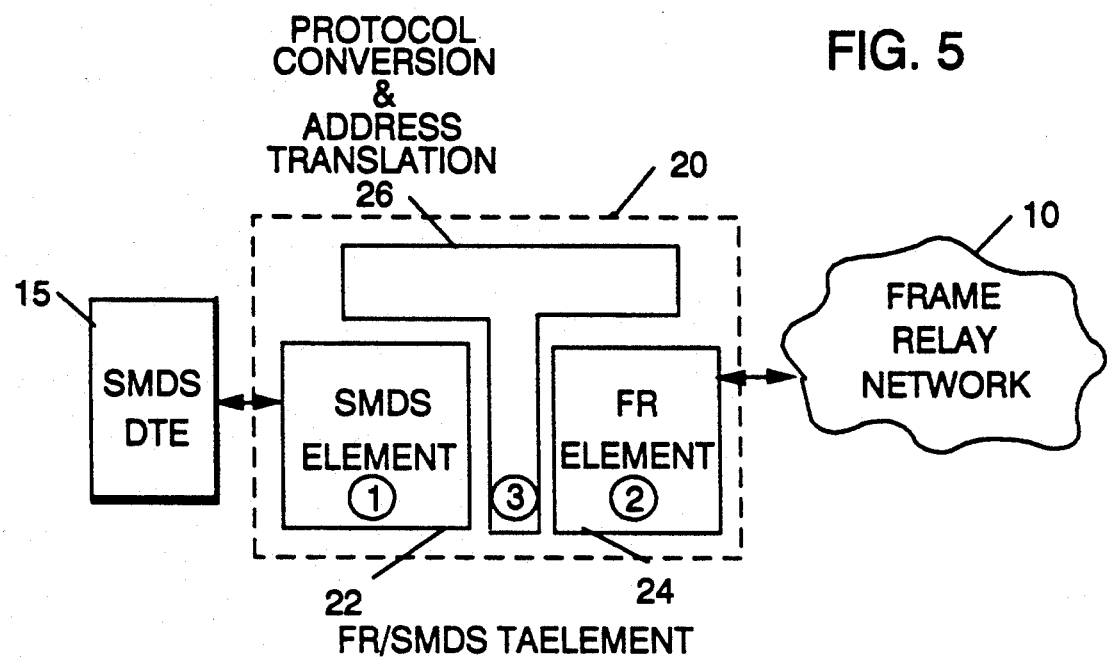
FIG. 5 is a diagram illustrating the three elements of the frame relay/SMDS terminal adapter interfacing with a frame relay network.

In order to interface a native frame relay DTE 15 with an SMDS network, the frame relay/SMDS terminal adapter 20 must conform, on the frame relay DTE side, to the protocols supported by the frame relay DTE. In particular, the frame relay DTE supports, at the physical layer, RS422, X.21, V.35 (fast RVX) or High Speed Serial Interface (HSSI). Similarly, FIGS. 3 and 5 illustrate the frame relay/SMDS terminal adapter 20 of the present invention interfacing between SMDS DTEs 15' and a frame relay network 10 and between a frame relay DTE 15 and a frame relay network 10. As when interfacing between an SMDS network 10' and a frame relay DTE 15, the frame relay/SMDS terminal adapter 20, in this set-up, must provide the same physical and logical layer support for both protocols in order to function properly as an interface. The only difference between the two set-ups is that corresponding address mapping as done by a protocol conversion and address translation element 26, to be discussed below. Therefore, at the physical layer on the frame relay DTE side, the frame relay/SMDS terminal adapter 20 must support these protocols.

At the data link control layer, a frame relay DTE supports CCITT I.121 (LAPD) core functions such as frame delimiting, frame multiplexing/demultiplexing, frame check sequence, etc. The frame relay/SMDS terminal adapter 20 must support these core functions.

On the SMDS network side, the frame relay/SMDS terminal adapter 20 must support SMDS protocol (IEEE 802.6). For example, at the physical layer on the SMDS network side, the frame relay/SMDS terminal adapter 20 must support either T1 or T3 framing. At layers above the physical layer, the data blocks must be segmented and reassembled into smaller fixed-sized cells (for transmission onto the SMDS network) or into larger variable length frames (when received from the SMDS network). This process will be discussed in greater detail.

In addition, the frame relay/SMDS terminal adapter 20 must perform address mapping between frame relay Data Link Control Identifier (DLCI) and SMDS E.164 addressing.

As shown in FIG. 4, the frame relay/SMDS terminal adapter 20 comprises three elements: (1) a frame relay element 22; (2) an SMDS element 24; and (3) a protocol conversion and address translation element 26.

a. The frame relay element

The frame relay element 22 interfaces with the frame relay DTE 15 and understands only the frame relay protocol. It receives frames of data from the frame relay DTE 15 and forwards them to the protocol conversion and address translation element 26 for protocol conversion and address translation. The frame relay element 22 also receives frames of data from the protocol conversion and address translation element 26 and forwards them to the frame relay DTE 15. The frame relay element 22 operates over two layers: (1) a physical layer; and (2) a logical layer.

Over the physical layer, the frame relay element 22 supports either a V.35 (fast RVX - up to 1.5 Mbps) or HSSI (from 1.5 to 52 Mbps) interface. Over the logical layer, the frame relay element 22 interfaces with the protocol conversion and address translation element 26 by, in one direction, forwarding frames received from the protocol conversion and address translation element 26 to the physical layer for transmission to the frame relay DTE 15 and, in the other direction, parsing the frame relay header and trailer of the frames received from the frame relay DTE 15 before forwarding those frames to the protocol conversion and address translation element 26. By parsing the header and trailer of the frame relay frames, the frame relay element 22, at the logical layer, performs frame delimiting, DLCI checking, frame check sequence, etc., as specified by I.121.

b. The SMDS element

The SMDS element 24 interfaces between, on one side, the protocol conversion and address translation element 26 and, on the other side, the SMDS network 10' and understands only the SMDS protocol. In one direction, the SMDS element 24 receives frames of data from the SMDS network 10' and forwards them to the protocol conversion and address translation element 26. In the opposite direction, the SMDS element 24 receives frames from the protocol conversion and address translation element 26 and forwards them to the SMDS network 10'.

The SMDS element 24 operates over three layers: (1) a physical layer: (2) a logical layer; and (3) an SMDS layer. Over the physical layer, the SMDS element 24 supports either T1 or T3 framing for interfacing with the SMDS network 10', depending upon the service provided by the network.

Figure 6:
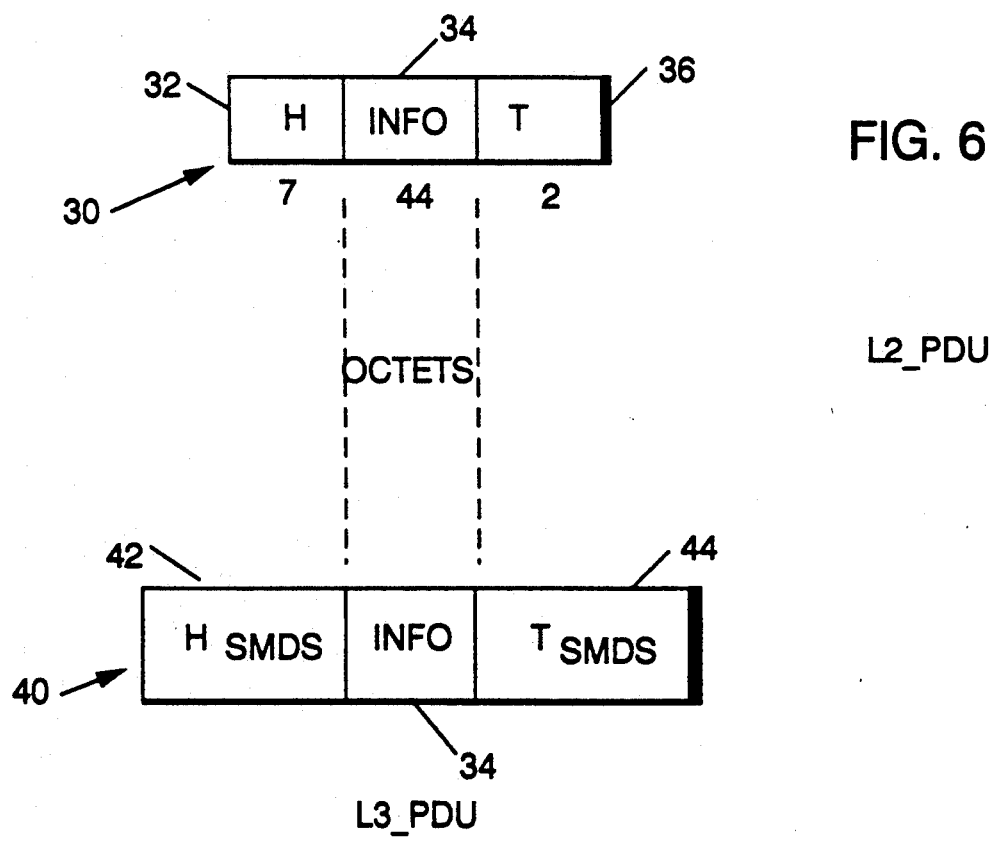
FIG. 6 is a diagram illustrating the segmentation of a L2_PDU and reassembly to a L3_PDU.

Over the logical layer, in one direction, the SMDS element 24 receives fixed-sized cells of data from the SMDS network 10'. These cells of data, Layer 2 Packet Data Units, or L2_PDUs, are shown in FIG. 6. Each L2_PDU 30 consists of 53 octets; seven octets comprising the header ("H") 32, 44 octets comprising the information ("Info") 34, and two octets comprising the trailer ("T") 36. Each L2_PDU 30 conforms to the IEEE 802.6 standard for SMDS networking. At the logical layer, the header "H" 32 and the trailer "T" 36 of each L2_PDU 30 are verified and removed. The "Info" portions 44 are then assembled into a frame, or L3_PDU 40, by adding, at either end, an SMDS header, $H_{SMDS}$ 42, and an SMDS trailer, $T_{SMDS}$ 44, for transmission to the SMDS layer. Each $H_{SMDS}$ 42 includes source and destination addresses, length field (frame size), sequence number, protocol ID, etc. The $T_{SMDS}$ 44 is a subset of the $H_{SMDS}$ 42 and includes only the length field and sequence number.

Figure 7:
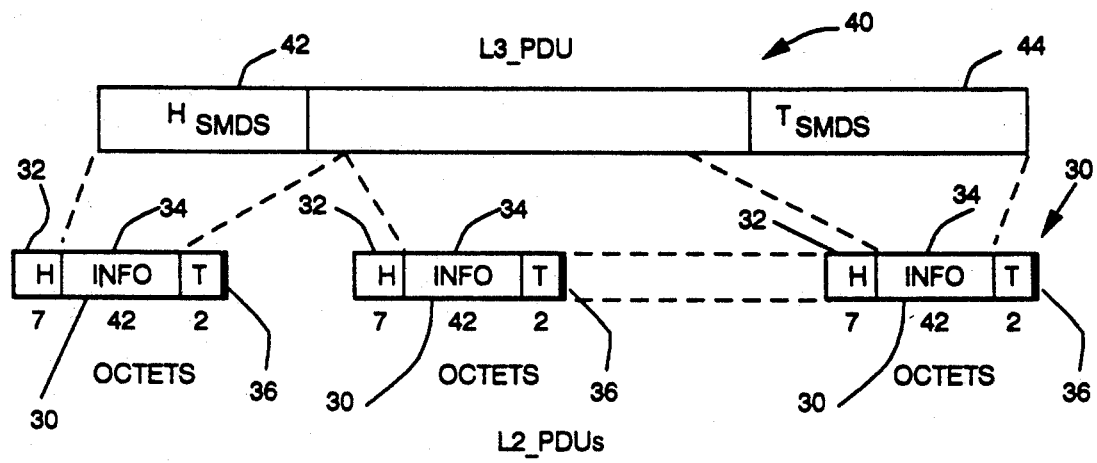
FIG. 7 is a diagram illustrating the segmentation of a L3_PDU and reassembly to a L2_PDU.

In the other direction, as shown in FIG. 7, at the logical layer, the SMDS element receives a Layer 3 Packet Data Unit (L3_PDU) 40 from the SMDS layer, segments the L3_PDU 40 into fixed sized-blocks ("Info" 34), and appends a header ("H" 32) and a trailer ("T" 36) to each block ("Info" 34) to form an L2_PDU 30. Each L2_PDU 30 is forwarded to the physical layer for transmission over the SMDS network.

Over the third, or SMDS layer, the SMDS element 24 interfaces with the protocol conversion and address translation element 26 and, in one direction, receives frames of data therefrom. Because SMDS headers and trailers are already appended by the protocol conversion and address translation element 26, the frames are simply forwarded to the SMDS element logical layer. In the other direction, the SMDS layer receives L3_PDUs 40 from the logical layer and performs parsing to assure that the $H_{SMDS}$ 42 and the $T_{SMDS}$ 44 are correct before the L3_PDUs 40 are forwarded to the protocol conversion and address translation element 26.

c. The Protocol Conversion and Address Translation element

The protocol conversion and address translation element 26 acts as an interface between the frame relay element 22 and the SMDS element 24 and performs the following functions on an incoming frame (from either the frame relay element 22 or the SMDS element 24): (1) removes the original frame header and trailer; (2) performs address mapping between frame relay DLCI and SMDS E.164; and (3) appends the new frame header and trailer.

Figure 8:
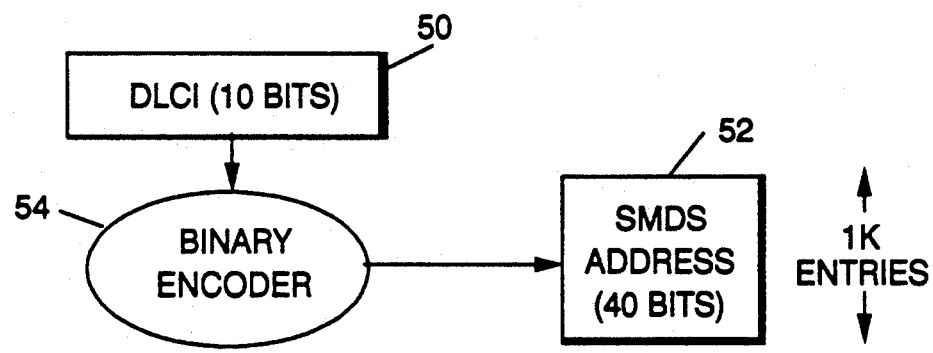
FIG. 8 is a block diagram illustrating the method of a frame relay address to an SMDS address.

The protocol conversion and address translation element 26 is required to do address mapping in two directions: (1) DLCI to SMDS destination address mapping; and (2) SMDS source address to DLCI mapping, and, therefore, two tables are required. DLCI to SMDS destination address mapping, shown in FIG. 8, is used when frames are going from the frame relay DTE 15 to the SMDS network 10'. The DLCI 50, which, in this case, comprises ten bits, identifies the frame relay destination address. In order to operate over the SMDS network 10', the DLCI 50 must be mapped to a corresponding SMDS destination address. All of the corresponding SMDS addresses are set forth in SMDS Address Table 52. Because the DLCI 50 is 10 bits wide, there are, at a maximum, $2^{10}$ or approximately 1000 corresponding SMDS addresses. Therefore, the SMDS Address Table 52 is 1000 memory spaces high. For U.S.-only service, an SMDS address is 40 bits wide representing the hexidecimal encoding of a 10-digit telephone number. This is illustrated below with the following example. The telephone number (919) 254-9717 has the following 40-bit representation:

1001 0001 1001 0010 0101 0100 1001 0111 0001 0111

(9   1   9)  2    5    4  - 9   7    1   7.

Thus, for U.S-only service, the SMDS Address Table 52 is 40 bits wide and $2^{10}$ bits high. In order to map the frame relay address to the SMDS address, the DLCI 50 is input to a binary encoder 54 which points to the appropriate memory space in the SMDS Address Table 52 where the corresponding SMDS address is located.

In the other direction (when the frames are going from the SMDS network to the frame relay DTE), the source SMDS address must be mapped to the DLCI. The SMDS address to DLCI mapping will be discussed later.

2. SMDS Address to DLCI Mapping Technique

As discussed above, mapping is required between DLCI and E.164 addresses. When mapping from frame relay to SMDS, because the DLCI is only ten (10) bits wide, there are a maximum of $2^{10}$, or approximately 1000 corresponding E.164 addresses (or telephone numbers). A table having $2^{10}$ memory spaces, each memory space being 10 digits, or 40 bits wide (the width of the U.S.-only E.164 telephone number), is sufficient for frame relay to SMDS mapping. Because of the relatively small number of memory spaces, the direct mapping method using the binary encoder 54 described above can be utilized without undue delay. When mapping from SMDS to frame relay, however, a table having $2^{40}$ (over one trillion) memory spaces would be needed using the direct mapping method. Clearly, another method must be utilized.

a. The conventional mapping technique

Figures 9, 21:
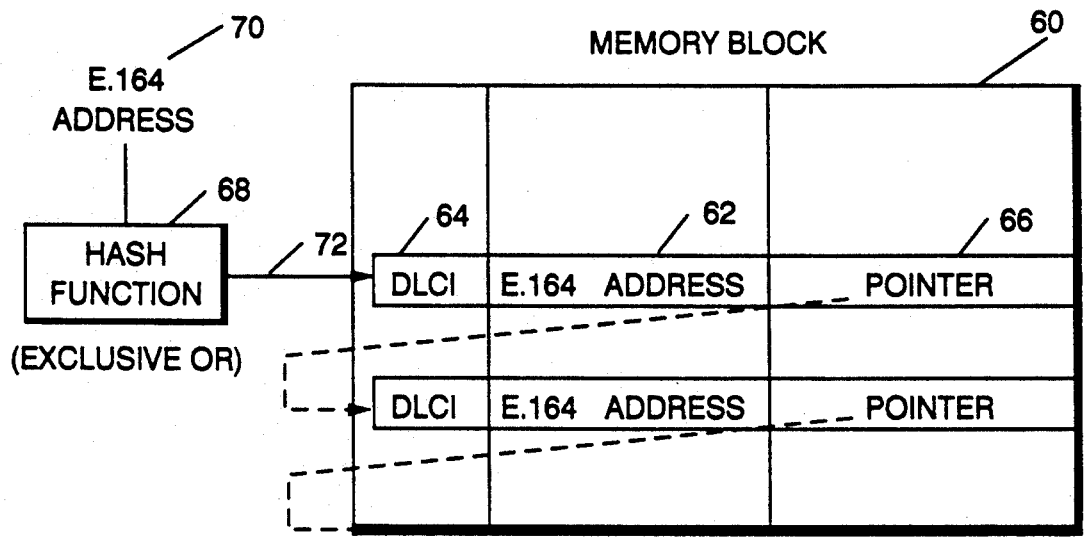
FIG. 9 is a block diagram of prior art showing the present address mapping technique.
FIG. 21 is a truth table for the combinational logic circuitry of the mapping system.
Figure 11:
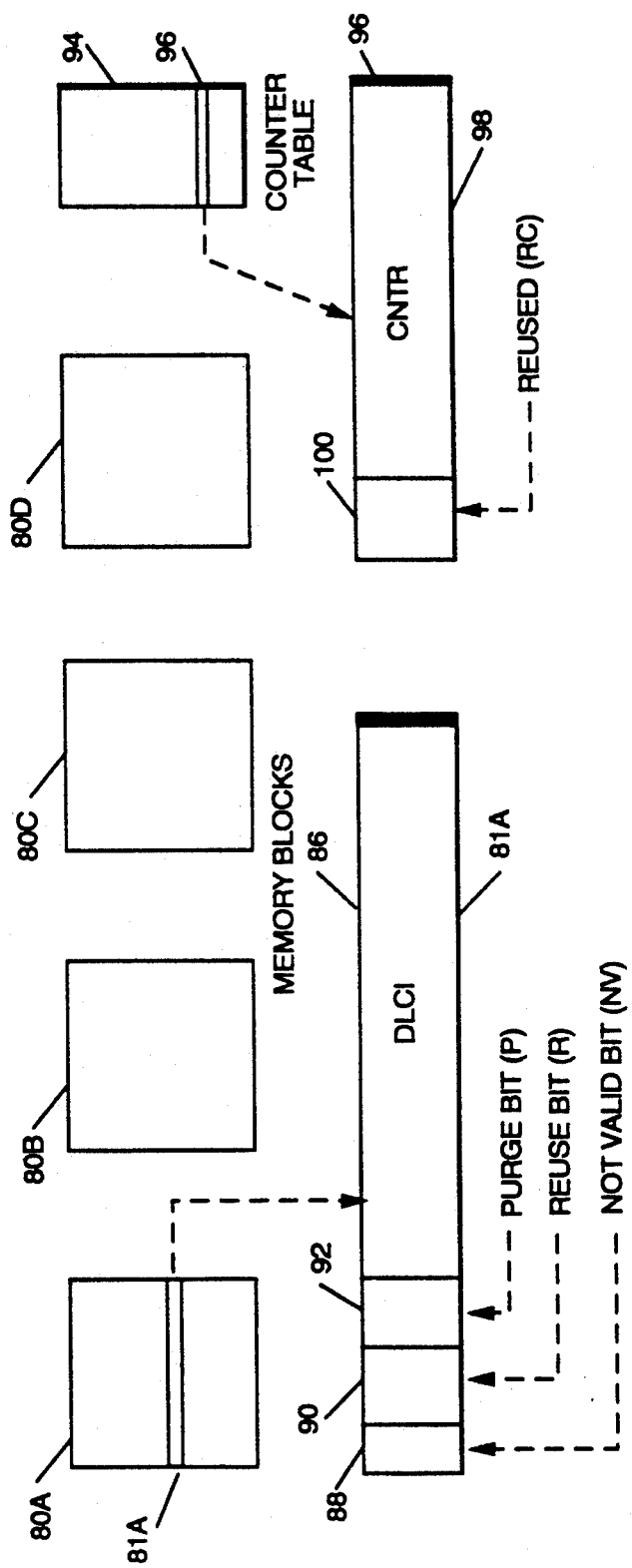
FIG. 11 is a diagram showing the mapping system during set-up.

The conventional technique is illustrated in FIG. 9. Memory block 60 has $2^{10}$ memory spaces, each memory space containing the following three items: the E.164 address 62, its corresponding DLCI 64 and a pointer 66. The E.164 address to-be-mapped 70 is "hashed" through a hashing function 68. In many cases, the hashing function 68 is simply an EXCLUSIVE-OR function. When the entry 72 is accessed through the hashing function 68, the E.164 address to-be-mapped 70 is compared with the E.164 address 62 in the memory block 60. If a match occurs, the corresponding DLCI 64 is the correct mapped address. If a match does not occur, a "collision" occurs. The value of the pointer 66 is used to access the next table entry, and the same compare process is repeated. Using the conventional technique, the undue repetition of table access and E.164 address comparison results in very slow access time.

b. Parallel address mapping technique using multiple tables

A new parallel address mapping technique eliminates the comparison requirement, eliminates the requirement to keep a pointer in the table, minimizes the probability of collision, and, with hardware assist, performs the mapping function in parallel.

The parallel address mapping technique of the present invention comprises two stages: (1) an initial table set-up stage; and (2) a table access stage. During the table set-up stage, the E.164 to DLCI mapping tables are initially configured so that the proper table entries are set in the appropriate places within the tables. The initial configuration occurs at the subscription time and remains unchanged unless an address needs to be changed or deleted. During the second stage, the table is accessed each time an E.164 address needs to be mapped to a DLCI.

As illustrated in FIG. 10, in the parallel address mapping technique, four tables 80a, 80b, 80c, and 80d, each having a length of $2^{10}$, or approximately 1K, memory spaces, are utilized instead of the single 1K table of the conventional method. Four memory spaces 81a, 81b, 81c, and 81d, one in each of the tables 80a, 80b, 80c, and 80d, are illustrated. Each memory space 81a, 81b, 81c, and 81d stores a single DLCI, multiple DLCIs or no DLCIs.

Pointers 82a, 82b, 82c, and 82d are utilized to point to each memory space of the tables 80a, 80b, 80c, and 80d, respectively. The 40-bit E.164 address is divided into four 10-bit groups, each group defining one of the pointers 82a, 82b, 82c, and 82d. Because there are 10 hex digits associated with each E.164 address, each pointer 82a, 82b, 82c, and 82d is derived from selecting a bit from each hex digit. In particular, pointer 82a comprises the first bit of each hex digit, pointer 82b comprises the second bit from each hex digit, and so forth. Although other ways of dividing the 40-bit E.164 address may be used, dividing the E.164 address in this manner minimizes collision. The objective is to spread the E.164 address in all the table, thereby minimizing collision.

In accordance with the proposed mapping method, when the tables are being accessed, if there is a single DLCI in one of the memory spaces 81a, 81b, 81c, and 81d corresponding to one of the pointers 82a, 82b, 82c, and 82d, it is the correct one. If there are multiple entries in all four of the memory spaces 81a, 81b, 81c, and 81d indexed for a particular E.164 address, it must be determined whether there is a common DLCI in the four indexed memory spaces. If there is, the common DLCI is the correct one. If in the unlikely event that there are multiple DLCIs in each indexed memory space and there is not a common DLCI in the four indexed memory spaces, a safety buffer 84 (FIG. 20) contains the corresponding DLCI.

As an illustration, the telephone number (919)254-9717 of the previous example is used. As shown in FIG. 10, the E.164 address comprises ten hex digits, each hex digit having four bits. Pointer 82a utilizes the first bit from each hex digit thereby comprising the 10-bit address "1010001000". Likewise, pointer 82b comprises the second bit from each hex digit, and so on.

In this example, memory space 81d indexed by pointer 82d contains only a single DLCI and, therefore, it is the DLCI which corresponds to the E.164 address (919)254-9717. Assuming that memory space 81d contains multiple DLCIs, it would then have to be determined whether a common DLCI existed among the four indexed memory spaces 81a, 81b, 81c, and 81d. In this example, the common DLCI is 9. Assuming that in the unlikely event there was no common DLCI among the indexed memory spaces of the four tables 80a, 80b, 80c, and 80d, safety buffer 84 (FIG. 20) would contain the correct DLCI. It should be noted that, in FIG. 10, memory spaces 81a, 81b, and 82c are shown to have multiple DLCIs only to illustrate the concept of the mapping technique. In reality, the memory spaces have a fixed size of one DLCI and three control bits. This will be described below.

1. Table set-up

The objective of the implementation is to have a single DLCI in each memory space so that the entry size of all of the memory spaces 81a, 81b, 81c, and 81d may be fixed. This is accomplished during the table set-up stage.

Figure 19:
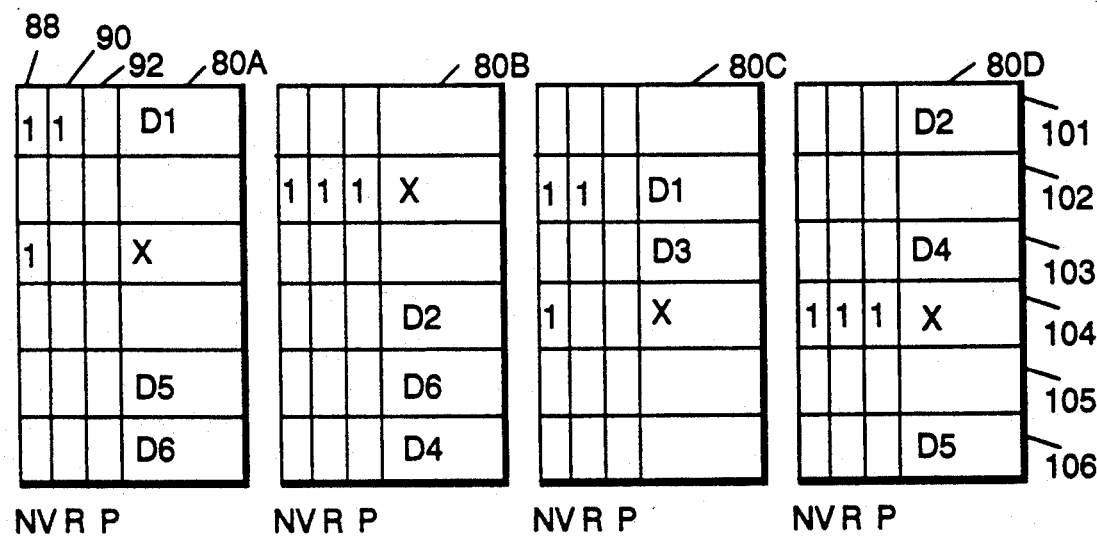

As shown in FIG. 19, each memory space 81a, 81b, 81c, and 81d contains a single DLCI 86, and three control bits: a Not-Valid (NV) bit 88; a Reuse (R) bit 90; and a Purge (P) bit 92.

In addition, there is a 1K counter table 94 having a counter 96 associated with each of the 1K DLCIs. Each counter 96 contains a counter value (CNTR 98), which ranges between zero and four to indicate the number of valid entries for that DLCI, and a single control bit—a Reused (Rc) bit 100.

During table set-up, the counters and the control bits work together. When the initial DLCI is mapped into the memory, it is entered into a memory space in all four tables 80a, 80b, 80c, and 80d, all of the control bits in the four corresponding memory spaces are set to zero, and the counter associated with that DLCI is set to four to indicate four valid entries. When another DLCI is mapped into the memory, a "collision" occurs when it is entered into a memory space having another DLCI therein. When a collision occurs in one memory space of a table, the NV bit 88 of that space is set, and the counter associated with that DLCI is decremented by one. When all spaces associated with a single DLCI are invalidated (all have NV=1), the count (CNTR) associated with that DLCI goes down to zero and R bit 90 and Rc bit 100 associated with that DLCI are set. The presence of the NV bits 88 and the R bits 90 in all four tables 80a, 80b, 80c, and 80d and the Rc bit 100 in the counter indicate that the entry is valid again, and the CNTR associated with that DLCI is again set to four. If a collision occurs when both an NV bit 88 and an R bit 90 are set, a P bit 92 is set to indicate that the entry is again to be invalidated. It is extremely unlikely that all entries associated with a single DLCI will be purged for the following reasons:

1. The address to the tables is spread out, a bit from each hex digit. This has the effect of spreading out the E.164 addresses to all table entries.

2. Because there are four tables, any one hit (a single DLCI in one entry) will produce the correct DLCI. It takes four collisions to wipe out the correct DLCI.

3. When the above conditions occurs, i.e., all entries are invalidated, all entries associated to that DLCI can be used again using the Reuse bit.

4. It takes an additional four collisions to wipe out the same four entries again. In the event that it occurs, a DLCI associated with that E.164 address is kept in a separate buffer.

An example of a table set-up is detailed below and is shown in corresponding FIGS. 12-19. For simplicity, six DLCIs (D1-D6) corresponding to six E.164 addresses (E1-E6) will be set up in four tables (80a, 80b, 80c, and 80d). In addition, only six memory spaces (101, 102, 103, 104, 105, and 106) in each table 80a, 80b, 80c, and 80d are shown. As a practical matter, thousands of DLCIs have to be set up in this manner during the initial terminal adapter configuration and each table 80a, 80b, 80c, and 80d has many more memory spaces, e.g., 1 Kbyte.

Also, for clarity, the four pointers 82a, 82b, 82c, and 82d are referenced as $P1_x$, $P2_x$, $P3_x$, and $P4_x$, respectively, where x indicates for which DLCI (D1-D6) the pointer is being used for. Pointers $P1_x$, $P2_x$, $P3_x$, and $P4_x$ point to memory tables 80a, 80b, 80c, and 80d, respectively. Counter table 94 is shown having six counters 111, 112, 113, 114, 115, and 116 corresponding to the six DLCIs. Table 110 shows the relationship between the six E.164 addresses (E1-E6) and their corresponding DLCIs (D1-D6).

Referring to FIG. 12, the set-up for DLCI D1 is shown. As described above, the particular E.164 address (in this case, E1) is segmented into four groups (pointers $P1_1$, $P2_1$, $P3_1$, and $P4_1$) for indicating the four memory spaces (one in each table 80a, 80b, 80c, and 80d) in which to enter the corresponding DLCI (in this case, D1). In this example, $P1_1$ points to memory space 101 and D1 is entered therein. Likewise, pointers $P2_1$, $P3_1$ and $P4_1$ point to memory spaces 102, 102, and 104, respectively, and D1 is entered therein accordingly. Because there is no collision, counter 111 for D1 is set to "4" for four valid entries and none of the control bits NV bit 88, R bit 90, P bit 92 or Rc bit 100 are set.

FIG. 13 illustrates a similar set-up for E.164 address E2. E2 is segmented into four groups, pointers $P1_2$, $P2_2$, $P3_2$, and $P4_2$, which point to memory spaces 101, 103, 104, and 101, in memory tables 80a, 80b, 80c, and 80d, respectively. The DLCI for E2, D2, is entered in these memory spaces. Because, in memory table 80a, memory space 101, D1 is already entered, a collision occurs. As a result, NV bit 88 bit for that memory space is set, counter 112 for D2 is set to "3" (indicating three valid entries for D2). Also, counter 111 for D1 is decremented to three indicating the remaining three valid entries for D1.

In FIG. 14, DLCI D3 (for E3) is set-up in the memory tables 80a, 80b, 80c, and 80d. D3 is entered in the memory spaces pointed to by pointers $P1_3$, $P2_3$, $P3_3$, and $P4_3$ and collisions occur in memory table 80b and 80d (memory spaces 102 and 104, respectively). NV bit 88 is set in each of the two memory spaces, counter 111 is decremented by two (two more invalid entries for D1) and counter 113 for D3 is set to two. The entry for memory space 101 in table 80a is an "X" indicating a "don't care" state because NV bit 88 is set and R bit 90 is reset.

In FIG. 15, DLCI D4 is set-up according to the steps described above. The not valid bits, NV bit 88, of memory space 103, table 80a and memory space 102, table 80c are set, counters 111 and 113 are decremented by one and counter 114 is set to two. Because counter 111 is now equal to zero, its "reused" bit, Rc 100, is set and the counter value is returned to four as can be seen in FIG. 16. In addition, the "reuse" bits 90 of memory spaces 101, 102, 102 and 104 of the tables 80a, 80b, 80c, and 80d, respectively are set and the values of the respective memory spaces is set, once again, to D1.

In FIG. 17, the set-up for D5 shows that D1 is again collided with (in table 80b) as is D2 (in table 80c). Because memory space 102 in table 80b has previously been "reused", it cannot be reused again and therefore must be "purged", i.e., purge bit, P bit 92, of that memory space is set. Counters 111 and 112 are decremented.

FIG. 18 illustrates the set-up of D6 wherein a collision occurs at memory space 104 of table 80c and at memory space 104 of table 80d, the latter of the two being purged because it had already been reused. Counter 111 is decremented by one to two and counter 116 is set to two.

FIG. 19 shows the final result (ready for look-up) in the memory tables 80a, 80b, 80c, and 80d after initial configuration wherein each DLCI has a valid entry in at least one memory space. If, however, one of the counters was equal to zero and its Rc bit 100 was set, there would be no valid entries for that particular DLCI and that DLCI would have to be stored in a separate buffer. This result is highly unlikely.

After the initial set-up, or anytime the terminal adapter needs to be reconfigured such as when a new link needs to be set-up or a link needs to be taken down, neither table 110 nor counter table 94 are needed.

In summary, each memory space may be used more than once using the control bits solving the problem of collisions. As long as there is at least one valid entry for a particular DLCI, it can be found very quickly (in a few memory cycles) in the memory tables. When there is no valid entry (highly unlikely) for a DLCI, it is stored in a separate buffer.

2. Table access

Figure 20:
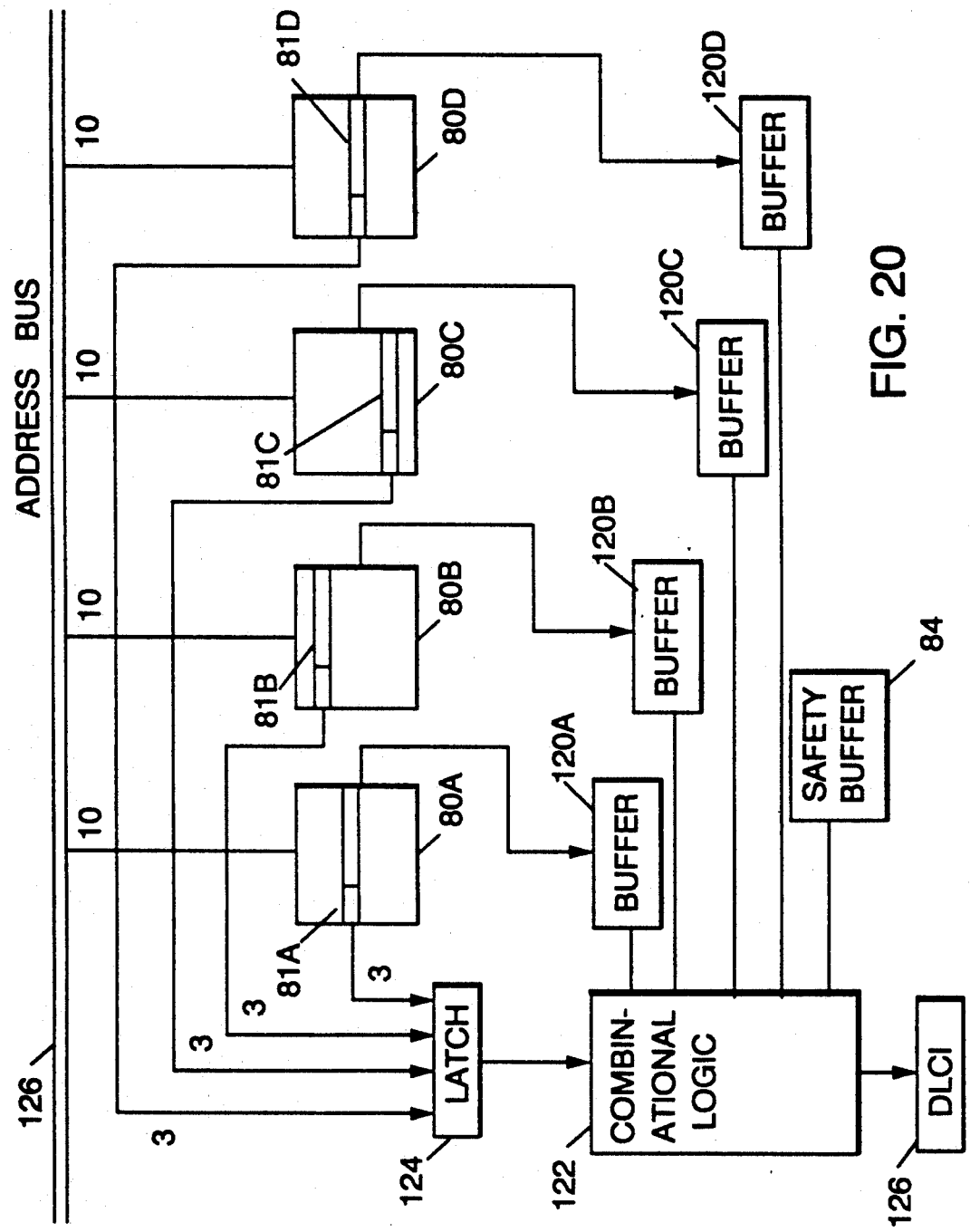
FIG. 20 is a block diagram showing table access.

The hardware structure for table access is shown in FIG. 20. The hardware structure comprises tables 80a, 80b, 80c, and 80d, associated buffers 120a, 120b, 120c, and 120d, safety buffer 84, combinational logic 122, latch 124 and a DLCI buffer 126. E.164 address bus 126 conveys the 40-bit E.164 address, the appropriate ten bits being conveyed to each memory table 80a, 80b, 80c, and 80d. In addition, each memory space 81a, 81b, 81c, and 81d is connected to a buffer 120a, 120b, 120c, and 120d for passing its DLCI contents thereto is connected and to the latch 124 for passing its control bit contents (NV bit 88, R bit 90 and P bit 92). The outputs of each of the buffers 120a, 120b, 120c, and 120d and safety buffer 84 are input to combinational logic 122. The control bits are latched to the combinational logic 122 in order to determine which buffer output contains the appropriate DLCI. The appropriate buffer output is conveyed from the combinational logic 122 to DLCI buffer 126.

In operation, the 40-bit E.164 address is conveyed to the memory tables 80a, 80b, 80c, and 80d in the appropriate ten-bit groups as discussed above. The ten-bit groups comprise the pointers, which point to, or address, the particular memory space 81a, 81b, 81c, and 81d in each memory table 80a, 80b, 80c, and 80d. The contents of the addressed memory spaces 81a, 81b, 81c, and 81d are passed to latch 124 (control bits portion) and to buffers 120a, 120b, 120c, and 120d (DLCI portion). The control bits are latched to the combinational logic 122. Based on the logic circuitry, the appropriate DLCI is conveyed to DLCI buffer 126. In the event that all four entries from the tables are purged, the fifth (safety) buffer 86 contains the correct DLCI.

The truth table associated with the combinational logic is shown in FIG. 21. In the truth table, NV1, NV2, NV3, and NV4 represent the not valid bits (NV bit 88), R1, R2, R3 and R4 represent the reuse bits (R bit 90), and P1, P2, P3 and P4 represent the purge bits (P bit 92), of each memory space 81a, 81b, 81c, and 81d. 01, 02, 03, 04, and 05 are the outputs of the combinational logic 122 indicating which buffer contains the appropriate DLCI, where 01 indicates that buffer 120a containing the DLCI from memory space 81a is the appropriate DLCI for the particular E.164 address and is conveyed to DLCI buffer 126. Similarly, 02 indicates that buffer 120b containing the DLCI from memory space 81b is the appropriate DLCI for the particular E.164 address and is conveyed to DLCI buffer 126, and so forth for 03 and 04. 05 indicates that safety buffer 84 contains the appropriate DLCI for the particular E.164 address being mapped and is conveyed to the DLCI buffer 126.

Thus, it can be seen that the unique terminal adapter of the present invention interfaces between a Data Terminating Equipment (DTE) and either a Frame Relay or a Switched Multimegabit Data Service (SMDS) telecommunications network so that the type of network over which the DTE is communicating is transparent to the DTE. This allows the subscriber to access both frame relay and SMDS networks without having to purchase to different terminal adapters. The terminal adapter of the present invention performs mapping from one protocol to another so that a native frame relay DTE can access an SMDS network and so that a native SMDS DTE can access a frame relay network. The unique address mapping method performed by the terminal adapter uses a parallel table look-up technique which reduces the chance of collision (when two or more addresses hash into the same table entry), eliminates the traditional comparison function to detect a collision, and eliminates the traditional pointer technique when a collision occurs. This address mapping method dramatically reduces the cycle time involved in mapping between addresses, especially when one address is significantly larger than the other.

While the invention has been particularly shown and described with reference to preferred embodiments thereof, it will be understood by those skilled in the art that various other changes in form and detail may be made without departing from the spirit and scope of the invention.

What is claimed is:

1. A terminal adapter for interfacing a native frame relay DTE with an SMDS telecommunications network so that said SMDS network is transparent to said frame relay DTE, said terminal adapter comprising:

a frame relay element for interfacing with said frame relay DTE;

an SMDS element for interfacing with said SMDS network; and a protocol conversion and address translation element connected between said frame relay element and said SMDS element for converting the transmission protocol between frame relay and SMDS and for translating the addresses between frame relay and SMDS, said frame relay element comprising means for receiving frames of data from said frame relay DTE, each frame having a header and a trailer, means for parsing said frames of data, and means for passing said parsed frames of data to said protocol conversion and address translation element, said frame relay element further comprising means for receiving frames of data from said protocol conversion and address translation element and means for sending frames of data to said frame relay DTE;

said SMDS element comprising means for receiving cells of data from said SMDS network, each cell having a header and a trailer, means for verifying and removing said headers and trailers thereby forming shorter fixed-sized data blocks, means for assembling a plurality of data blocks, and means for passing said assembled data blocks to said protocol conversion and address translation element, said SMDS element further comprising means for receiving assembled data blocks from said protocol conversion and address translation element, means for segmenting said assembled data blocks into said shorter fixed-sized data blocks, means for adding a header and a trailer to each fixed-sized data block so as to form a plurality of cells of data, and means for sending said cells of data to said SMDS network; and said protocol conversion and address translation element comprising means for sending and receiving frames of data to and from said frame relay element, means for sending and receiving assembled data blocks to and from said SMDS element, means for removing the frame relay headers and trailers from said received frames of data and for appending SMDS headers and trailers to said assembled data blocks to be sent to said SMDS element, means for removing the SMDS headers and trailers from said received assembled blocks of data and for appending frame relay headers and trailers to said frames of data to be sent to said frame relay element, means for translating frame relay addresses to SMDS addresses and means for translating SMDS addresses to frame relay addresses.

2. The terminal adapter defined in claim 1, wherein said terminal adapter further interfaces between a native SMDS DTE and a frame relay network, said frame relay element further comprises means for receiving frames of data from said frame relay network, and means for sending frames of data to said frame relay network; and said SMDS element further comprises means for receiving cells of data from said SMDS DTE, each cell having a header and a trailer, and means for sending said cells of data to said SMDS DTE.

3. The terminal adapter defined in claim 1, wherein said means for translating SMDS addresses to frame relay addresses comprises;

a plurality of table each having a plurality of memory spaces, each memory space of each table having a unique memory-address indicating the location of that memory space within its table, each table further having an associated pointer register having a value ranging from the lowest memory-address to the highest memory-address of that table;

means for forming the values of said pointer registers based upon said SMDS address by segmenting said SMDS address into a plurality of portions and assigning each portion to a pointer register;

means for examining the contents of the memory space of each table having a memory-address equal to the value of the table's associated pointer register;

means for determining whether the contents of each of said addressed memory spaces is valid; and means for retrieving a valid entry when any of said addressed memory spaces has a valid entry.

4. The terminal adapter as defined in claim 3, wherein said means for translating SMDS addresses to frame relay addresses further comprises a separate buffer and means for retrieving the contents of said separate buffer when there is no valid entry among said addressed memory spaces.

5. The terminal adapter as defined in claim 3, wherein said SMDS address is a ten-digit number represented by ten four-bit groups, said plurality of tables comprise four tables, and said pointer register value forming means segments said SMDS address into four ten-bit portions.

6. The terminal adapter as defined in claim 5, wherein a first pointer register associated with a first table comprises the first bit of each of said ten four-bit groups, a second pointer register associated with a second table comprises the second bit of each of said ten four-bit groups, a third pointer register associated with a third table comprises the third bit of each of said ten four-bit groups, and a fourth pointer register associated with a fourth table comprises the fourth bit of each of said ten four-bit groups.

7. A terminal adapter for interfacing a native SMDS DTE with a frame relay telecommunications network so that said frame relay network is transparent to said SMDS DTE, said terminal adapter comprising:
   a frame relay element for interfacing with said frame relay network;
   an SMDS element for interfacing with said SMDS DTE; and
   a protocol conversion and address translation element connected between said frame relay element and said SMDS element for converting the transmission protocol between frame relay and SMDS and for translating the addresses between frame relay and SMDS,
   said frame relay element comprising means for receiving frames of data from said frame relay network, each frame having a header and a trailer, means for parsing said frames of data, and means for passing said parsed frames of data to said protocol conversion and address translation element, said frame relay element further comprising means for receiving frames of data from said protocol conversion and address translation element and means for sending frames of data to said frame relay network;
   said SMDS element comprising means for receiving cells of data from said SMDS DTE, each cell having a header and a trailer, means for verifying and removing said headers and trailers thereby forming shorter fixed-sized data blocks, means for assembling a plurality of data blocks, and means for passing said assembled data blocks to said protocol conversion and address translation element, said SMDS element further comprising means for receiving assembled data blocks from said protocol conversion and address translation element, means for segmenting said assembled data blocks into said shorter fixed-sized data blocks, means for adding a header and a trailer to each said fixed-sized data block so as to form a plurality of cells of data, and means for sending said cells of data to said SMDS DTE; and
   said protocol conversion and address translation element comprising means for sending and receiving frames of data to and from said frame relay element, means for sending and receiving assembled data blocks to and from said SMDS element, means for removing the frame relay headers and trailers from said received frames of data and for appending SMDS headers and trailers to said assembled data blocks to be sent to said SMDS element, means for removing the SMDS headers and trailers from said received assembled blocks of data and for appending frame relay headers and trailers to said frames of data to be sent to said frame relay element, means for translating frame relay addresses to SMDS addresses and means for translating SMDS addresses to frame relay addresses.

8. A system for retrieving a particular entry based upon a particular call-up number having a plurality of digits, said system comprising:
   a plurality of tables each having a plurality of memory spaces, each memory space of each table having an entry portion and further having a unique memory-address indicating the location of that memory space within its table, each table further having an associated pointer register having a value ranging from the lowest memory-address to the highest memory-address of that table;
   means for forming the values of said pointer registers based upon said call-up number by segmenting said call-up number into a plurality of portions and assigning each portion to a pointer register;
   means for examining the contents of the memory space of each table having a memory-address equal to the value of the table's associated pointer register;
   means for determining whether the contents of each of said addressed memory spaces is valid; and
   means for retrieving a valid entry when any of said addressed memory spaces has a valid entry.

9. The system as defined in claim 8 further comprising a separate buffer and means for retrieving the contents of said separate buffer when there is no valid entry among said addressed memory spaces.

10. The system as defined in claim 9, wherein said call-up number is a ten-digit number represented by ten four-bit groups, said plurality of tables comprise four tables, and said pointer register value forming means segments said call-up number into four ten-bit portions.

11. The system as defined in claim 10, wherein a first pointer register associated with a first table comprises the first bit of each of said ten four-bit groups, a second pointer register associated with a second table comprises the second bit of each of said ten four-bit groups, a third pointer register associated with a third table comprises the third bit of each of said ten four-bit groups, and a fourth pointer register associated with a fourth table comprises the fourth bit of each of said ten four-bit groups.

12. The system as defined in claim 11, wherein each memory space comprises a control bit portion and an entry portion, said control bit portion having a first control bit (NV), a second control bit (R) and a third control bit (P), said system further comprising combinational logic circuitry for determining said particular entry based upon said particular call-up number, said combinational circuitry being connected to said control bit portion and said entry portion of said addressed memory spaces, said combinational logic circuitry conforming to the following truth table:

| INPUT | | | | | | | | | | | |
|---|---|---|---|---|---|---|---|---|---|---|---|
| NV1 | NV2 | NV3 | NV4 | R1 | R2 | R3 | R4 | P1 | P2 | P3 | P4 |
| 0 | x | x | x | x | x | x | x | x | x | x | x |
| 1 | 0 | x | x | x | x | x | x | x | x | x | x |
| 1 | 1 | 0 | x | x | x | x | x | x | x | x | x |
| 1 | 1 | 1 | 0 | x | x | x | x | x | x | x | x |
| 1 | 1 | 1 | 1 | 1 | x | x | x | 0 | x | x | x |
| 1 | 1 | 1 | 1 | 0 | 1 | x | x | x | 0 | x | x |
| 1 | 1 | 1 | 1 | 0 | 0 | 1 | x | x | x | 0 | x |
| 1 | 1 | 1 | 1 | 0 | 0 | 0 | 1 | x | x | x | 0 |

-continued

| 1 | 1 | 1 | 1 | x | x | x | x | 1 | 1 | 1 | 1 |
|---|---|---|---|---|---|---|---|---|---|---|---|

| OUTPUT | | | | |
|----|----|----|----|----|
| O1 | O2 | O3 | O4 | O5 |
| 1 | 0 | 0 | 0 | 0 |
| 0 | 1 | 0 | 0 | 0 |
| 0 | 0 | 1 | 0 | 0 |
| 0 | 0 | 0 | 1 | 0 |
| 1 | 0 | 0 | 0 | 0 |
| 0 | 1 | 0 | 0 | 0 |
| 0 | 0 | 1 | 0 | 0 |
| 0 | 0 | 0 | 1 | 0 |
| 0 | 0 | 0 | 0 | 1 | wherein NV1, NV2, NV3 and NV4 are said first control bits of said addressed memory spaces, R1, R2, R3 and R4 are said second control bits of said addressed memory spaces, P1, P2, P3 and P4 are said third control bits of said addressed memory spaces, and O1, O2, O3, O4 and O5 are bits corresponding to said entry portions of said addressed memory spaces and of said separate buffer, respectively, indicating which of said entry portions is said particular entry, and x indicates a "don't care" condition.

13. The system as defined in claim 9, wherein each memory space comprises a first control bit portion having a first control bit and a second entry portion, and further wherein said number of entries determining means comprises means for reading said first control bit.

14. The system as defined in claim 13, wherein each first control bit portion further comprises a second control bit, and further wherein said common entry determining means comprises means for reading said second control bit.

15. The system as defined in claim 14, wherein each first control bit portion further comprises a third control bit, and further wherein said common entry determining means further comprises means for reading said third control bit.

16. For use in a system comprising a plurality of tables each having a plurality of memory spaces, each memory space of a table having a unique memory-address indicating the location of that memory space within its table, each table further having an associated pointer register having a value ranging from the lowest memory-address to the highest memory-address of that table, a method of retrieving a particular entry from one of said memory spaces based upon a particular call-up number having a plurality of digits, said method comprising the steps of:
forming the values of said pointer registers based upon said call-up number by segmenting said call-up number into a plurality of portions and assigning each portion to a pointer register;
examining the contents of the memory space of each table having a memory-address equal to the value of the table's associated pointer register;
determining whether the contents of each of said addressed memory spaces is valid; and
when any of said addressed memory spaces has a valid entry, retrieving said valid entry.

17. The method as defined in claim 16 further comprising the step of retrieving the contents of a separate buffer when there is no valid entry among said addressed memory spaces.

18. A system for interfacing with an SMDS telecommunications network comprising a native frame relay (DTE) and a terminal adapter, said terminal adapter comprising a frame relay element for interfacing with said frame relay DTE, an SMDS element for interfacing with said SMDS network, and a protocol conversion and address translation element connected between said frame relay element and said SMDS element for converting the transmission protocol between frame relay and SMDS and for translating the addresses between frame relay and SMDS, said frame relay element comprising means for receiving frames of data from said frame relay DTE, each frame having a header and a trailer, means for parsing said frames of data, and means for passing said parsed frames of data to said protocol conversion and address translation element, said frame relay element further comprising means for receiving frames of data from said protocol conversion and address translation element and means for sending frames of data to said frame relay DTE, said SMDS element comprising means for receiving cells of data from said SMDS network, each cell having a header and a trailer, means for verifying and removing said headers and trailers thereby forming shorter fixed-sized data blocks, means for assembling a plurality of data blocks, and means for passing said assembled data blocks to said protocol conversion and address translation element, said SMDS element further comprising means for receiving assembled data blocks from said protocol conversion and address translation element, means for segmenting said assembled data blocks into said shorter fixed-sized data blocks, means for adding a header and a trailer to each fixed-sized data block so as to form a plurality of cells of data, and means for sending said cells of data to said SMDS network, and said protocol conversion and address translation element comprising means for sending and receiving frames of data to and from said frame relay element, means for sending and receiving assembled data blocks to and from said SMDS element, means for removing the frame relay headers and trailers from said received frames of data and for appending SMDS headers and trailers to said assembled data blocks to be sent to said SMDS element, means for removing the SMDS headers and trailers from said received assembled blocks of data and for appending frame relay headers and trailers to said frames of data to be sent to said frame relay element, means for translating frame relay addresses to SMDS addresses and means for translating SMDS addresses to frame relay addresses.

19. The system defined in claim 18 for further interfacing with a frame relay network, wherein said terminal adapter further interfaces between a native SMDS DTE and said frame relay network, said frame relay element further comprises means for receiving frames of data from said frame relay network, and means for sending frames of data to said frame relay network; and said SMDS element further comprises means for receiving cells of data from said SMDS DTE, each cell having a header and a trailer, and means for sending said cells of data to said SMDS DTE.

* * * * *